July 24, 1951  R. C. INGELS  2,561,474
COORDINATED ELECTRIC HEATER AND THERMOSTAT MOUNTING
Filed Oct. 21, 1948
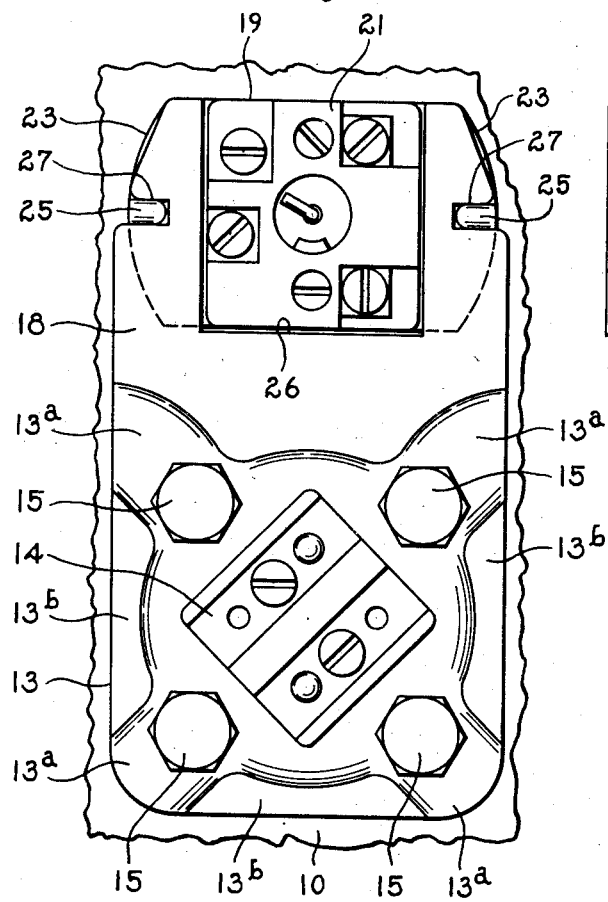
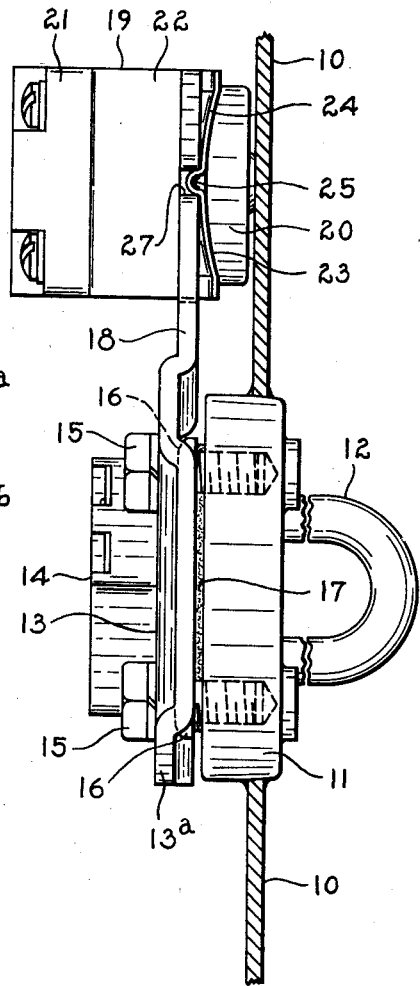
Inventor
Raymond C. Ingels
By Frank H. Hubbard
Attorney Patented July 24, 1951

2,561,474

UNITED STATES PATENT OFFICE 2,561,474

COORDINATED ELECTRIC HEATER AND THERMOSTAT MOUNTING

Raymond C. Ingels, Chicago, Ill., assignor to Cutler-Hammer, Inc., Milwaukee, Wis., a corporation of Delaware Application October 21, 1948, Serial No. 55,683

5 Claims. (Cl. 219—38)

This invention relates to coordinated electric heater and thermostat assemblies and more particularly to coordinated mountings for attaching to a tank or vessel an immersion heater and an external thermostat.

An object of the invention is to coordinate for attachment jointly heater and thermostat mountings, the latter being adapted to receive after attachment thereof a thermostat to be supported thereby in contact with the tank or vessel.

Another object is to provide heater and thermostat mountings coordinated to be attached to a tank or vessel by the means which would be required for the heater mounting alone and further to provide for removability of the thermostat from its mounting without loosening the means attaching the mountings to the tank or vessel.

Another object is to provide for attachment of such coordinated heater and thermostat mountings by bolts thereby to avoid need of welding and to eliminate danger of accumulation of material between the mountings and the tank or vessel incidental to galvanizing after welding.

Another object is to coordinate in unitary form the heater and thermostat mountings with consequent facility of handling and installing the same.

Another object is to provide a one-piece heater and thermostat mounting unit wherein the mass of the mounting contiguous to the thermostat will not be objectionable.

Other objects and advantages of the invention will hereinafter appear.

The accompanying drawing illustrates a preferred embodiment of the invention which will now be described, it being understood that the embodiment illustrated is susceptible of various modifications without departing from the scope of the appended claims.

In the drawing,

Figure 1 is a front elevational view of the heater and thermostat mountings, and Fig. 2 is a side elevation of the heater and thermostat mountings shown in Fig. 1, this view showing in section a tank wall.

Referring to the drawings, the coordinated heater and thermostat mountings are shown in Fig. 2 as attached to a wall 10 representative of a side of a tank or vessel, said wall having an opening in which is fitted and secured as by welding an annular flange 11 preferably of metal. As will be understood, tank walls are commonly provided with such an opening to afford entrance for a heater and with such an annular flange tapped to receive attaching bolts of the heater mounting.

The heater assembly inclusive of its mounting is shown as of the type disclosed in the Charbonneau Patent No. 2,471,609, dated May 31, 1949, for Electric Immersion Heaters, and assigned to the assignee of the instant application. This type of heater assembly comprises a so-called tubular heater 12 bent into hairpin form assembled with and supported by a non-corrosive plate 16 of which only small portions appear in Fig. 2, said plate being penetrated by the tubular heater and being sealed with the casing thereof. Plate 16 shields the assembly from the contents of the tank and carries a gasket 17 (Fig. 2) to make a fluid-tight joint between the assembly and the tank. Said heater assembly further includes a mounting plate 13 which serves to clamp non-corrosive plate 16 to the tank wall and carries a terminal block 14 to which it is tied. Bolts 15 are provided to attach the assembly to the annular flange 11 of the tank wall.

The mounting plate 13 in this instance has an integral extension 18, which as will appear is utilized as the thermostat mounting, and in this respect said plate differs from the mounting plate shown in said Charbonneau patent. Plate 13 like the Charbonneau plate is perforated at four equally spaced points to receive the bolts 15 and between its perforated portions 13ª its marginal portions 13ᵇ are offset from said perforated portions and from the central portion of the plate. The plate, preferably of steel, is so formed to afford it the required ruggedness while permitting use of thinner material than would be permissible in the case of a flat plate. Accordingly the extension 18 will be thinner than would be an extension of a flat plate having the required thickness for heater mounting. In the present instance the extension 18 of plate 13 is of the full width of the plate and hence said plate has marginal portions 13ᵇ only on three sides, but extension 18 is offset similarly to said marginal portions to lie in its entirety in the same or substantially the same plate as that of said marginal portions. As illustrated the extension 18 is preferably upstanding when the plate 13 is bolted to the flange 11 for mounting of the heater, said extension having some clearance from the tank wall, which clearance may vary somewhat as with variations in the setup of the clamping bolts.

The thermostatic controller to be supported by extension 18 is designated as 19 and comprises a thermostat power element 20 and a terminal block 21, both carried by a metal casing 22 and respectively extending from opposite ends of said casing. Casing 22 adjacent said power element has outwardly extending wing portions 23, preferably of the relative size and shape illustrated in Fig. 1. Said wing portions have resiliency and each in edge elevation is bowed toward the block carrying end of the casing, each having a curved surface 24 and a boss 25.

Extension 18 of plate 13 has an open slot 26 at its upper end to receive the casing 22 with the bowed wing portions of said casing interposed between said extension and the tank wall. Thus the thermostatic device 19 may be detached from the mounting 18 during attachment of said mounting and thereafter readily slipped into said mounting. When the thermostatic device is slipped into the mounting 18 in the manner aforeindicated the resilient bowed wing portions of the casing 22 bear against the back of the mounting 18 and thus serve to press the thermostat power element 20 against the tank wall, taking up within limits variations in spacing of element 18 from the tank wall. The mounting element 18 additionally has suitably positioned notches 27 to receive the bosses 25 on the wing portions 23 of the casing 22 when said casing has been fully inserted into mounting 18.

To remove the thermostatic device 19 from its mounting 18 it is necessary merely to disengage bosses 25 from notches 27 and lift said device until it is free from the mounting. Here it is to be noted that the thermostatic device is readily removable without loosening any of the attaching bolts 15. In consequence the seal between the heater mounting and the tank is in nowise impaired by removal and replacement of the thermostatic device.

In the application of Clarence W. Kuhn, Serial No. 66,252, filed December 20, 1948, and assigned to the assignee of the instant application there is disclosed a similar thermostatic device with a twist-lock connection with a mounting plate attached to the tank in a different manner. Obviously such twist-lock connection might be substituted for the slip type connection herein disclosed.

Also it will be obvious to those skilled in the art that if greater resiliency of the mounting element 18 be desired this can be obtained in various ways including reduction of the thickness of the element 18 in the process of forming the plate 13 or by forming the element 18 separately and suitably attaching it to the heater mounting plate.

As will be understood the thermostatic device is ordinarily employed to commutate the heater connections in one of the well-known ways but of course said device might be employed for any other desired purpose to which it is suited.

I claim:

1. For attachment to the wall of a tank or the like, an immersion type electric heater for insertion through an opening in said tank wall, a one-piece supporting and attaching mounting therefor, said mounting being adapted to effect closure of said opening, a thermostatic device to be engaged with the tank wall externally thereof, and a mounting element for said device supported by said heater mounting and extending laterally therefrom, said device and said mounting element therefor having interlocking parts, and said device and said mounting element therefor constituting an assembly with resiliency of engagement of said device with the tank wall, thus to be self-adapting to variations in final position of said heater mounting, said interlocking parts affording by mere relative movements of said device and its said mounting element attachability and removability of the former in respect of the latter after attachment of said heater mounting to the tank wall and without need of loosening said heater mounting.

2. For attachment to the wall of a tank or the like, an immersion type electric heater for insertion through an opening in said tank wall, a one-piece supporting and attaching mounting therefor, said mounting being adapted to effect closure of said opening, a thermostatic device to be engaged with the tank wall externally thereof, and a laterally extending mounting element for said device supported by said heater mounting and being integral with a part thereof, said device and said mounting element therefor having interlocking parts and said device and said mounting element constituting an assembly affording resiliency of engagement of said device with the tank wall, thus to be self-adapting to variations in final position of said heater mounting.

3. For attachment to the wall of a tank or the like, an immersion type electric heater for insertion through an opening in said tank wall, a one-piece supporting and attaching mounting therefor, said mounting being adapted to effect closure of said opening, a thermostatic device to be engaged with the tank wall externally thereof, and a laterally extending mounting element for said device supported by said heater mounting and being integral with a part thereof, said device and said mounting element therefor having interlocking parts and said device and said mounting element therefor constituting an assembly affording resiliency of engagement of said device with the tank wall, thus to be self-adapting to variations in final position of said heater mounting, said interlocking parts affording by mere relative movements of said device and its said mounting element attachability and removability of the former in respect of the latter after attachment of said heater mounting to the tank wall and without need of loosening said heater mounting.

4. For attachment to the wall of a tank or the like, an immersion type electric heater, a supporting and attaching mounting therefor comprising a plate having marginal portions offset relative to central and corner portions of said plate to afford with a minimum thickness of said plate required strength and ruggedness, a thermostatic device to be engaged with the tank wall externally thereof, and a mounting element for said device comprising an extension of said plate offset similarly to said marginal portions, said device and said mounting element therefor having interlocking parts and said device and said mounting element therefor constituting an assembly affording resiliency of engagement of said device with said tank wall, thus to be self-adapting to variations in final position of said heater mounting, said interlocking parts affording by mere relative movements of said device and its said mounting element attachability and removability of the former in respect of the latter after attachment of said heater mounting to the tank wall and without need of loosening said heater mounting.

5. As an article of manufacture, a one-piece heater and thermostat mounting, said mounting comprising a plate having marginal portions offset relative to the central and corner portions of said plate to afford with minimum thickness of said plate required strength and ruggedness and a thermostat mounting portion comprising an extension offset similarly to said marginal portions, said thermostat mounting portion having an opening therethrough to receive a thermostat.

RAYMOND C. INGELS.

REFERENCES CITED

The following references are of record in the file of this patent:

UNITED STATES PATENTS

| Number | Name | Date |
|---|---|---|
| 1,750,907 | Skold | Mar. 18, 1930 |
| 1,994,909 | Ehrgott | Mar. 19, 1935 |
| 2,000,826 | Davies | May 7, 1935 |
| 2,432,169 | Morgan et al. | Dec. 9, 1947 |
| 2,437,262 | Levitt et al. | Mar. 9, 1948 |